United States Patent [19]

Thomas

[11] 4,271,598

[45] Jun. 9, 1981

[54] SURVEYING STAFFS

[75] Inventor: Donald G. Thomas, Dynnryne, Australia

[73] Assignee: Anson Engineering Pty. Ltd., Hobart, Australia

[21] Appl. No.: 88,107

[22] Filed: Oct. 24, 1979

[30] Foreign Application Priority Data

Nov. 5, 1978 [AU] Australia .................. PD6614

[51] Int. Cl.³ .................. G01C 15/02; G01C 15/06
[52] U.S. Cl. .................. 33/293; 33/294
[58] Field of Search ............. 33/293, 294, 295, 296

[56] References Cited

U.S. PATENT DOCUMENTS

| 1,161,358 | 11/1915 | Stotler et al. | 33/294 |
| 2,066,785 | 1/1937 | Lautermilch | 33/294 |
| 2,909,839 | 10/1959 | Miller | 33/294 |

FOREIGN PATENT DOCUMENTS 272691 10/1963 Australia .
417276 11/1967 Australia .

Primary Examiner—Steven L. Stephan
Attorney, Agent, or Firm—Frishauf, Holtz, Goodman and Woodward

[57] ABSTRACT

A surveyor's levelling staff which comprises an endless graduated band or strip on a hollow elongated body with a portion of the strip to be viewed extending along a longitudinal face of the body and the remainder of the strip disposed within the body. The strip passes around a spring-loaded tensioning roller and a winding and brake roller inside the body. The tensioning roller maintains a predetermined tension on the strip and the winding and brake roller includes a winding handle to move the strip along the longitudinal face of the body and through the body, and a brake which, in the locked position prevents relative movement of the strip.

7 Claims, 5 Drawing Figures

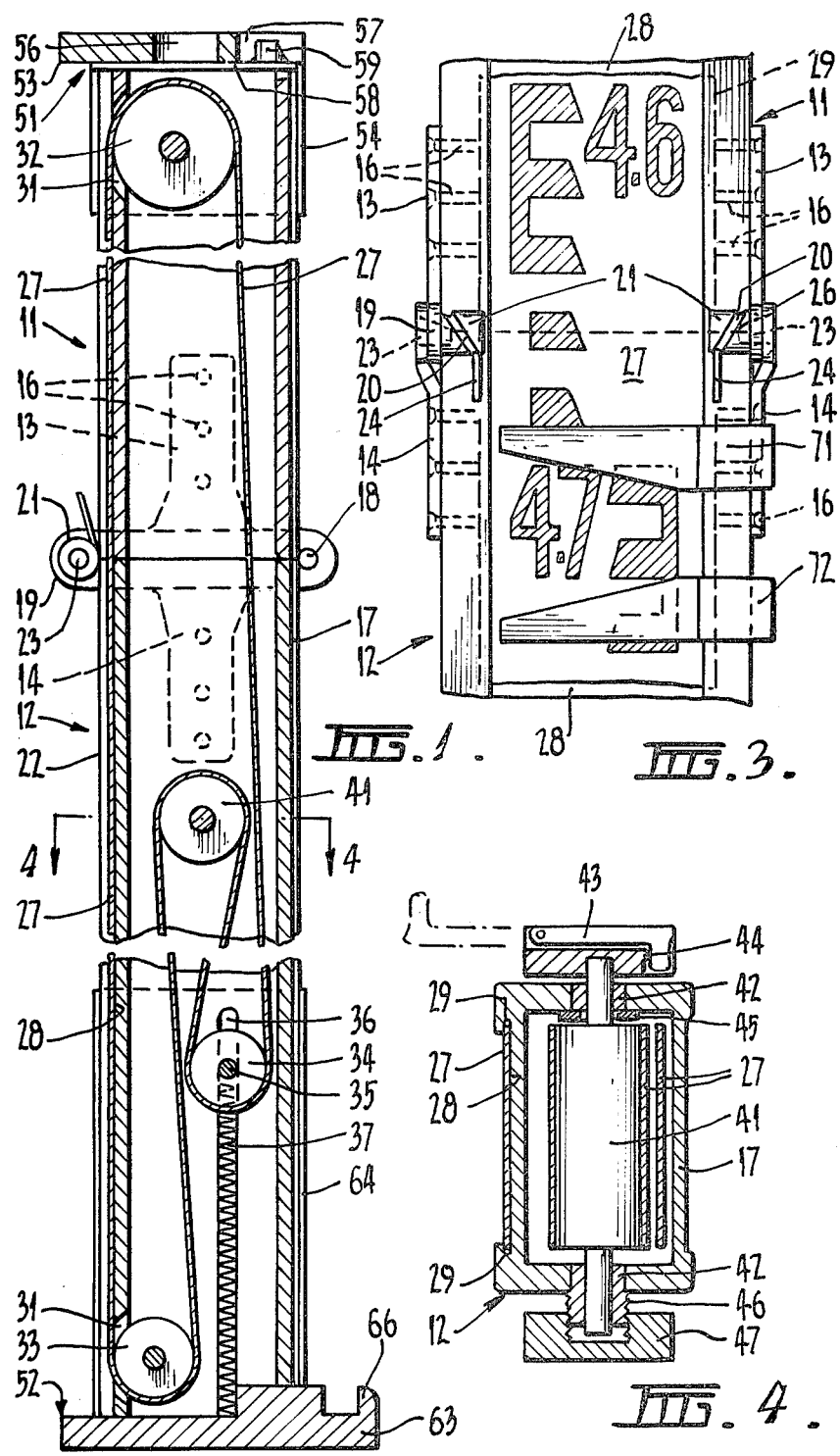

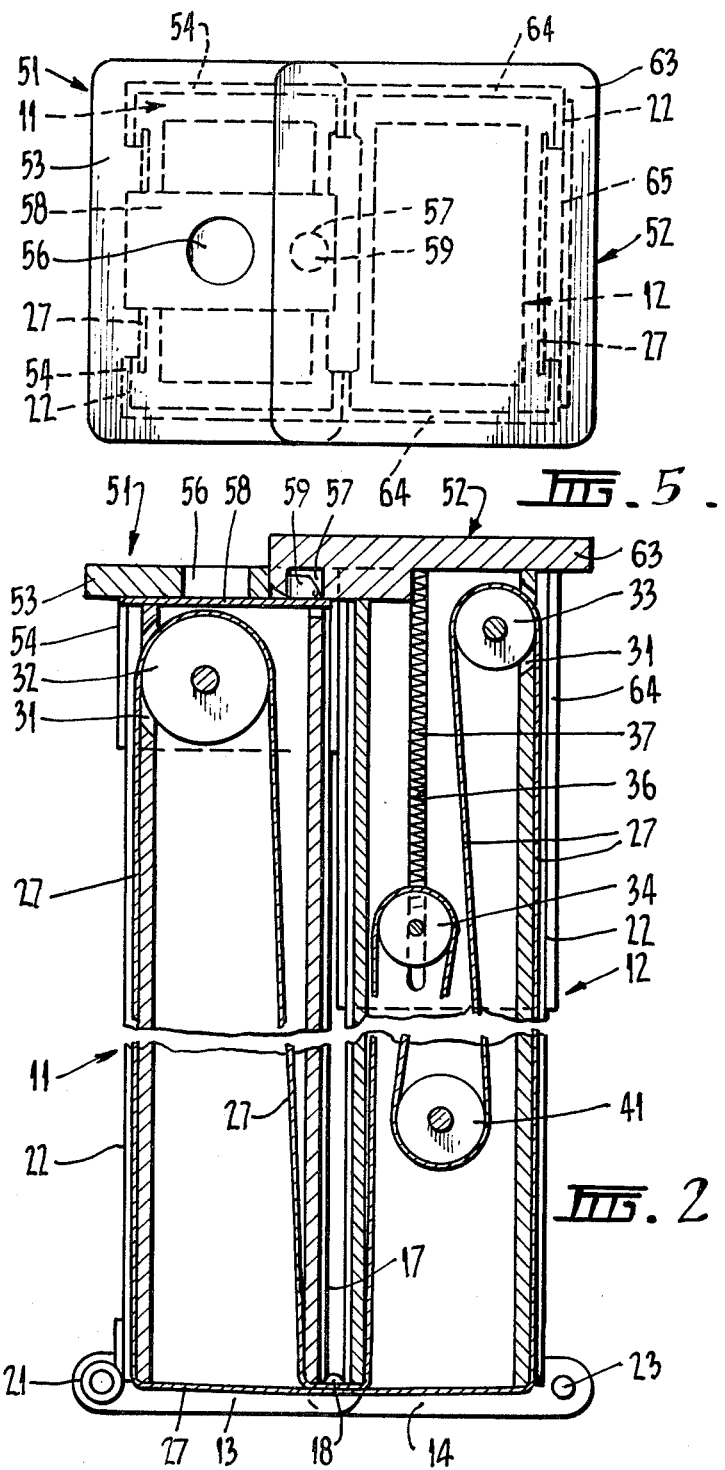

SURVEYING STAFFS

BACKGROUND OF THE INVENTION

This invention relates to improvements in surveyors staffs and relates particularly to an improved construction of surveyors staff which allows direct reading of survey levels without the necessity to conduct mathematical calculations.

Plane surveying or level surveying is traditionally carried out utilizing a level, commonly a dumpy level, tilting level or automatic level and a graduated surveying staff or rod. The level is an instrument used to define a horizontal plane, the plane being traced out by the line of collimation of a telescope constrained to rotate about a vertical axis. The traditional surveying staff or rod is generally an elongated rod of wood, metal or fiber glass material having graduations marked thereon which are visible when the rod is viewed through the level telescope. Normally the staff is graduated from zero at the base so that appropriate calculations can be made of the staff readings.

While traditional surveying staffs are formed of a single length of material, several staffs are known which are collapsible either by folding or by a telescopic-type action. One of the most widely used collapsible staffs is the "Philadelphia" rod, which is described in many surveying text books such as Elementary Surveying (5th edition) published by International Text Book Company, Scranton, Pa. (published 1970).

Australian Pat. No. 272691 issued to Mansfield J. Mitchley, dated Oct. 24, 1973, discloses another form of levelling staff in which one face of the staff has the traditional set of graduations and a second set of graduations are provided on a single length of movable tape supported on the other face of the staff. The movable tape is supported against the surface of the staff and is capable of sliding movement in a direction substantially parallel to the axis of the staff, the graduations of the movable tape being arranged to increase downwardly from the top. The tape is adapted to be wound around reels at each end of the staff. A similar construction of levelling rod is disclosed in Australian Pat. No. 417276 issued to Fredric H. Schneider, dated Nov. 2, 1967. This specification discloses an elongated levelling rod having a movable template strip extending along the rod and being furled at opposite ends thereof in coils. A plurality of measurement marker elements are removably secured to the face of the movable strip at predetermined positions. An index point is carried on a first of the furling means, and a target marker element is carried on the face of the strip at a predetermined position.

These proposed constructions of surveying staffs suffer the disadvantage that when the movable strip reaches the end of its travel the usefulness of the staff is substantially restricted.

A further known construction of levelling staff utilizes an endless band or tape which passes over rollers at each end of a solid timber rod. The tape or band is of metal and is of approximately ten (10) feet in length. With this construction, the range of levels which can be read from one setting of the tape is very limited. Further, the tape can move between readings thus substantially reducing accuracy of subsequent readings.

SUMMARY OF THE INVENTION

Briefly, the present invention comprises an improved levelling staff wherein a movable, endless, graduated strip is carried by a hollow body so that a portion of the strip is supported on a longitudinal face of the body, with the graduations on the strip thereby exposed, and the remainder of the strip is contained within the hollow body. The body carries guide means for the strip at each end of the body to guide the strip from the ends of the longitudinal face into the hollow body. Inside the body, the strip passes around a roller which is mounted with its axis extending transversely of the body and rotating means are provided for rotating the roller about its axis. Tensioning means are located within the body, the tensioning means being engaged by the movable strip to maintain a predetermined tension thereon.

In one form of the invention, the guide means at each end of the body comprise guide rollers, and the tensioning means includes a spring biassed roller, the movable strip being threaded around the guide rollers, the tensioning roller and the first mentioned roller.

The elongated hollow body may be formed in two halves which are hinged together so that the halves may be folded against each other for transportation purposes. With this arrangement, a locking device is provided to lock the halves in the unfolded position, and a latching device is provided to latch the halves in the folded position.

The present invention has been devised in view of the desirability of providing a levelling staff from which direct level readings may be taken and wherein the graduated face of the staff can be moved longitudinally along the staff to a position which corresponds to a known level.

It is also desirable to provide a levelling staff wherein the graduated face of the staff is movable when required but is maintained under a predetermined tension so that the exposed portion of the graduated strip is supported on a longitudinal face of the staff.

It is also desirable that the movable, endless graduated strip may be locked in a selected position, and to this end it is a preferred feature of the invention to provide locking means associated with the said first roller to effectively lock the roller and prevent rotation thereof.

The levelling staff of the present invention overcomes many of the noted disadvantages of prior levelling staffs and enables rapid and accurate levels to be obtained without the necessity to conduct the calculations normally required when a traditional levelling rod is used.

Other objects and advantageous features of the invention will become apparent to one skilled in the art from the following description of a preferred embodiment of the invention which is described with reference to the accompanying drawings.

BRIEF DESCRIPTION OF THE DRAWINGS

FIG. 1 is a sectional side elevational view of a levelling staff made in accordance with the present invention, FIG. 2 is a sectional side elevational view of the staff of FIG. 1 showing the staff in a folded position, FIG. 3 is a detail view showing the means for locking the staff in the unfolded position, and illustrating staff pointers, FIG. 4 is a cross sectional view taken along the lines 4—4 of FIG. 1, and FIG. 5 is a plan view of the folded staff of FIG. 2.

DESCRIPTION OF THE ILLUSTRATED EMBODIMENT

Referring to the drawings there is shown a levelling staff which is formed of two elongated box sectioned body members 11 and 12 hinged together so as to form, in the extended position, a continuous hollow body, as shown in FIG. 1. In the preferred embodiment illustrated, each body member 11 and 12 is of two meters in length. Each body member 11 and 12 is fabricated from timber sections adhered together, although it will be appreciated that each body member 11 and 12 may be formed of extruded fiber glass, fabricated fiber glass, extruded metal, rigid synthetic plastic or other similar material.

The body members 11 and 12 are hinged together by means of hinge plates 13 and 14 secured to the side walls of the body members 11 and 12 by bolts, rivets or screws 16. The hinge plates 13 and 14 extend beyond the rear surface 17 of the body members 11 and 12 and are interengaged by hinge pins 18 about which the body members 11 and 12 can pivot.

The hingeplates 13 also include forwardly extending portions 19 carrying bosses 21 which lie adjacent the front edge portions 22 of each body member. Each boss 21 has a helical slot 20 and a locking pin 23 located within each boss 21 is axially and rotatably movable therein by means of a locking lever 24 extending from the locking pin 23 and guided for movement in the helical slot 20. Thus, each locking lever 24 is movable about the axis of the associated locking pin 23 and the helical slot 20 guides the locking lever causing the locking pin 23 to move axially outwardly relative to the boss 21. The hinge plate 14 includes a forwardly extending portion 26 having a hole therein for engagement by the locking pin 23 to securely lock the two body members 11 and 12 in the extended position.

An endless strip or tape 27 is guided for movement along a front longitudinal surface 28 of the body in grooves 29 formed in the front edge portions 22 of the body. The tape 27 passes through slots 31 in the front surface 28 at the top and bottom of each body member 11 and 12 and passes over guide rollers 32 and 33 which are journalled in bearings located in the side walls of the body members. A take-up or tensioning roller 34 is located in the lower body member 12 with the shaft 35 of the tensioning roller 34 constrained for longitudinal movement by opposed slots 36 in the side walls of the body member 12. Tension springs 37 are located in each slot 36 and engage with each end of the shaft 35 and the bottom end of the body member 12 to bias the tensioning roller 34 towards the base of the body member 12.

A winding and brake roller 41 is also mounted in the lower body member 12. This roller 41, more particularly shown in FIG. 4, is journalled in bearings 42 in the side walls of the body member 12. The shaft of the roller 41 extends beyond the side walls and a folding winding handle 43 is fixed to one end of the roller shaft. The winding handle 43 may be moved from the position shown in FIG. 4 to that shown in dotted lines to enable the roller 41 to be rotated thereby. A friction clip 44 secures the handle in the folded position when not in use.

An annular friction pad 45 is secured, by adhesion, to the internal side wall of the body member 12 adjacent the winding handle 43, and co-axial with the bearing 42. The opposite bearing 42 includes a threaded extension 46 which is engaged by a knurled nut 47. The shaft of the brake roller 41 extends beyond the end of the threaded extension 46 to be engaged by the knurled nut to thereby axially move the brake roller 41. It will be seen that as the brake roller 41 is axially moved by the knurled nut 47 one surface of the roller 41 engages the friction pad 45. As the nut 47 is tightened, rotational movement of the brake roller is prevented.

As shown particularly in FIG. 1, the endless tape 27 passes from the top guide roller 32 down the interior of the body members 11 and 12, around the tensioning roller 34, upwardly in the body member 12 to the winding and brake roller 41 and then down to the bottom guide roller 33. The tape may be moved to any desired position by the winding handle 43, after release of the brake, and the tape may then be locked in the desired position by tightening of the knurled nut 47.

The tape 27 is provided on its exposed surface with graduations which can be read from a distance through the telescope of a surveying instrument. Desired graduations are illustrated in FIG. 3, although it will be appreciated that any suitable form of graduations may be printed or calibrated onto the tape. In the embodiment illustrated, the endless tape is of 10 meters in length and graduations extend from 0 through to 9.9 meters with one centimeter divisions. The graduations increase downwardly from the top of the staff so that direct reading of levels may be obtained. It is a feature of this embodiment of the invention that the staff accommodates a tape of 10 meters in length which, when the staff is in use, enables the tape to be moved to the desired position whereat the person viewing the tape through a surveying instrument is able to read the first integer of a meter of the known reference level. For example, when the staff is placed on a known reference level, for example 47.21 meters, the tape is moved until the person sighting the tape through the surveying instrument reads 7.21 on the tape. The tape is then locked in the set position relative to the staff and all subsequent readings of the staff with the tape in that locked position provide direct readings of subsequent levels. For example, if the staff is then moved to a position where the person sighting the tape reads 5.32 then the level of the position at which the staff is placed is immediately known to be 45.32 meters.

Because the tape is 10 meters in length any known reference level can be quickly and accurately set by appropriate movement of the tape.

The body members 11 and 12 of the levelling staff are provided with end caps 51 and 52, respectively, which incorporate means for latching the body members 11 and 12 in the folded position, as shown in FIGS. 2 and 5. The end caps 51 and 52 also act to locate the shafts of the upper and lower guide rollers 32 and 33.

The top end cap 51 has a top plate 53 with downwardly extending substantially U-shaped side portions 54 which engage with the side walls of the body member 11, the front edge portions 22 and corresponding rear edge portions. The top plate 53 is provided with two holes 56 and 57, and a spring leaf 58 is riveted to the undersurface of the top plate 53 to extend beneath holes 56 and 57. The spring leaf 58 carries at its free end a catch member 59 which extends upwardly into the hole 57.

The bottom end cap 52 comprises a bottom plate 63 with upwardly extending side portions 64 which engage with the side walls, the front edge portions 22 and the corresponding rear edge portions of the body member 11. The side portions 64 extend beyond the height of the opposed slots 36 in the side walls of the body member 11. In the preferred embodiment of the invention, a transparent panel 65 extends between the side edge portions 64 adjacent the front edge portions 22 of the body member 11 to substantially cover the bottom slot 31 to prevent egress of moisture and dirt into the interior of the body member 11 whilst permitting readings to be taken of the tape 27 adjacent the lower guide roller 33.

The bottom plate 63 extends beyond the rear wall of the body member 11 and terminates in an upwardly extending lug 66. The lug 66 is chamfered on its outer edge.

When the body members 11 and 12 are pivoted about the hinge pins 18 to the position shown in FIG. 2, the lug 66 engages behind the catch member 59, the catch member being deflected during the latching movement. The latch may be released by finger pressure applied to the leaf spring 58 through the hole 56 in the top plate 53.

The end caps 51 and 52 are secured to the top and bottom ends of the body members 11 and 12 by suitable screws or rivets passing into the side walls.

To enable levels to be determined a fixed distance above or below a known level, a pair of movable pointers 71 and 72 may be attached to the levelling staff of the present invention. The pointers 71 and 72 may comprise substantially rigid plastic mouldings which are adapted to clip to the staff to engage the front and rear surfaces thereof. The pointers are formed to enable them to be moved past the hinge plates 13 and 14 and the locking bosses 21. In an alternative arrangement (not illustrated) the pointers are slidably mounted on a guide rail which is mounted to one front edge portion 22 of the body members 11 and 12. The guide rail is spaced from the front edge portions 22 so that the pointers 71 and 72 can be moved past the adjacent locking boss 21. The pointers 71 and 72 are formed with grooves which engage the guide rail and locking screws are provided to lock the pointers in the desired position relative to the guide rail.

In use, one pointer is fixed at the known desired level and the other pointer is fixed a distance from the first pointer corresponding to the desired level. The desired level is then determined by the base of the levelling staff when the person viewing the staff sights the second pointer.

It will be appreciated that the levelling staff of the invention may have standard graduations marked on the rear surface thereof. Also, a levelling bubble may be secured to the side wall of the staff to ensure that the staff is held in a vertical position during use.

The endless strip or tape 27 is preferably formed of a dimensionally stable, non-extensible, flexible synthetic plastic material such as is marketed under the trade mark "MYLAR". It is most desirable that the tape, and the body of the levelling staff, do not undergo dimensional change with changes in atmospheric conditions and temperature.

While an embodiment of the invention has been shown and described, further embodiments or combinations of the invention will be apparent to those skilled in the art without departing from the spirit of the invention.

I claim:
1. A levelling staff comprising:
   an elongated hollow body formed of two elongated body sections each having respective front and rear walls and opposed side walls;
   hinge means interconnecting adjacent ends of the body sections so that the body sections are pivotable relative to each other and movable from a folded position to an open position, said hinge means including hinge plates on each side wall of each body section, the hinge plates on each side wall having rearwardly extending portions interengaged by pivot pins and forwardly extending portions with substantially transversely movable latch pins to releasably interlock the hinge plates on each side when the body sections are in the open position;
   a latch plate on the free end of one body section and a cooperating latch member on the free end of the other body section to releasably engage the latch plate when the sections are in the folded position;
   a first roller mounted transversely within said body;
   handle means coupled to said first roller to rotate said first roller;
   brake means to releasably lock said first roller against rotation;
   roller guides on the side walls of said hollow body;
   a second transverse roller in said body and constrained for substantially longitudinal movement in said roller guides on the side walls of said body;
   spring means to bias the second roller towards one end of said guides;
   guide means at each end of the front surface of said hollow body; and
   a movable, endless, flexible, graduated tape carried by said hollow body, an exposed part of said tape engaging with the front surface of said body, the tape passing over said guide means and into the interior of said body and engaged with the first and second rollers therein, said second roller maintaining a predetermined tension on said tape when the body sections are in the folded or open positions.

2. A levelling staff according to claim 1, wherein said brake means comprises a friction pad which is secured to the internal surface of one side wall of the body adjacent the handle means; a threaded boss extending outwardly from the opposite side wall coaxial with the first roller; a shaft extending from the first roller through the threaded boss; and a threaded member engaged over the boss, the threaded member having an internal coaxial surface to engage with the end of the shaft to cause the shaft and first roller to move axially when the threaded member is threaded onto the boss, the end surface of the first roller thereby being moved axially into engagement with the friction pad.

3. A levelling staff according to claim 1, wherein said roller guides comprise slots extending longitudinally in said opposite side walls of one body section, and said spring means comprises a tension spring in each slot and engaged with the ends of the second roller which engage in the respective slot, the other end of each tension spring being engaged with the respective side wall.

4. A levelling staff according to claim 1, wherein one of each pair of hinge plates has a boss on the forwardly extending portion, each boss extending transversely of the body and adjacent the front face, the bosses each having a bore therethrough and a helical slot in the wall thereof, a pin closely fitting within the bore but axially and rotatably movable therein and a lever extending from the pin through the helical slot, the forwardly extending portion of the other of each pair of hinge members having apertures to receive a part of each said pin when said lever is moved in said slot to axially move the pin in the boss, thereby securing the hinge members and the body sections together.

5. A levelling staff according to claim 1, comprising end caps on the free end of each body section, the end caps including interengaging latch means to releasable secure the section in the folded position.

6. A levelling staff according to claim 1, further including at least two pointers mounted on the body for selective longitudinal movement therealong, said pointers including a transverse edge extending across the longitudinal face of the body.

7. A levelling staff comprising:

an elongated hollow body;

a movable, endless, flexible graduated strip carried by said body, a portion of said strip being supported on a longitudinal face of said body with said graduations thereof exposed, and the remainder of said strip being contained within said hollow body;

guide means for said strip at each end of said body to guide said strip from each end of the longitudinal face into the body;

a first roller mounted in said body with its axis extending transversely thereof, said first roller being fixed to a shaft which extends from each end of the roller through journals in the opposite side walls of the body;

rotating means comprising a handle fixed to one end of said shaft of said roller;

brake means including a friction pad secured to the internal surface of the side wall of the body adjacent the handle, a threaded boss extending outwardly from the opposite side wall coaxial with the other end of said shaft of the roller, and a threaded member engaged over the boss, the threaded member having an internal coaxial surface for engaging with the end of the shaft of the roller extending beyond the boss to cause the shaft and first roller to move axially when the threaded member is threaded onto the boss, the end surface of the first roller thereby being moved axially into engagement with the friction pad; and tensioning means within said body to maintain a predetermined tension on said strip, said strip being engaged with said tensioning means and said first roller and being movable along said longitudinal face and through said body.

* * * * *